April 18, 1961  H. C. REINHART ET AL  2,980,386
THERMOSTATIC GAS VALVE CONTROL
Filed April 30, 1959  2 Sheets-Sheet 1
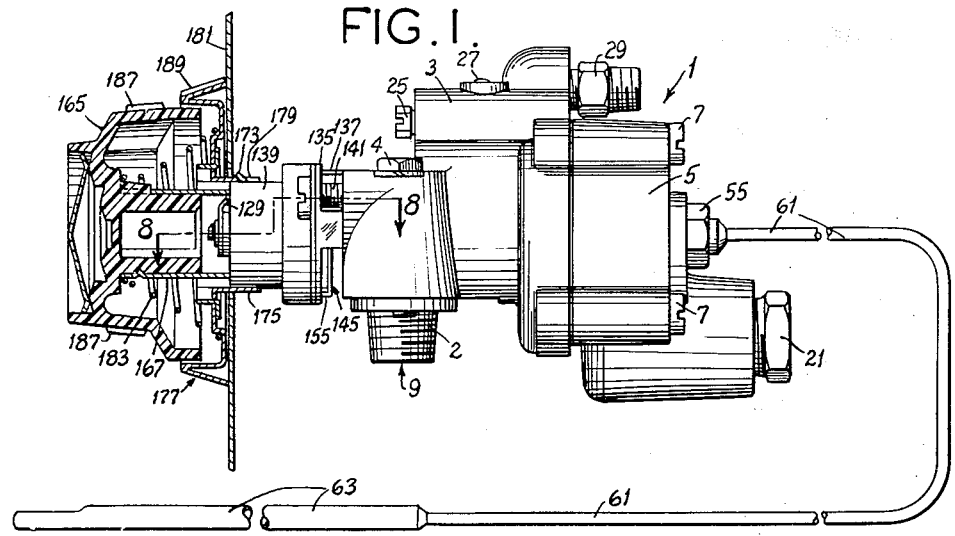
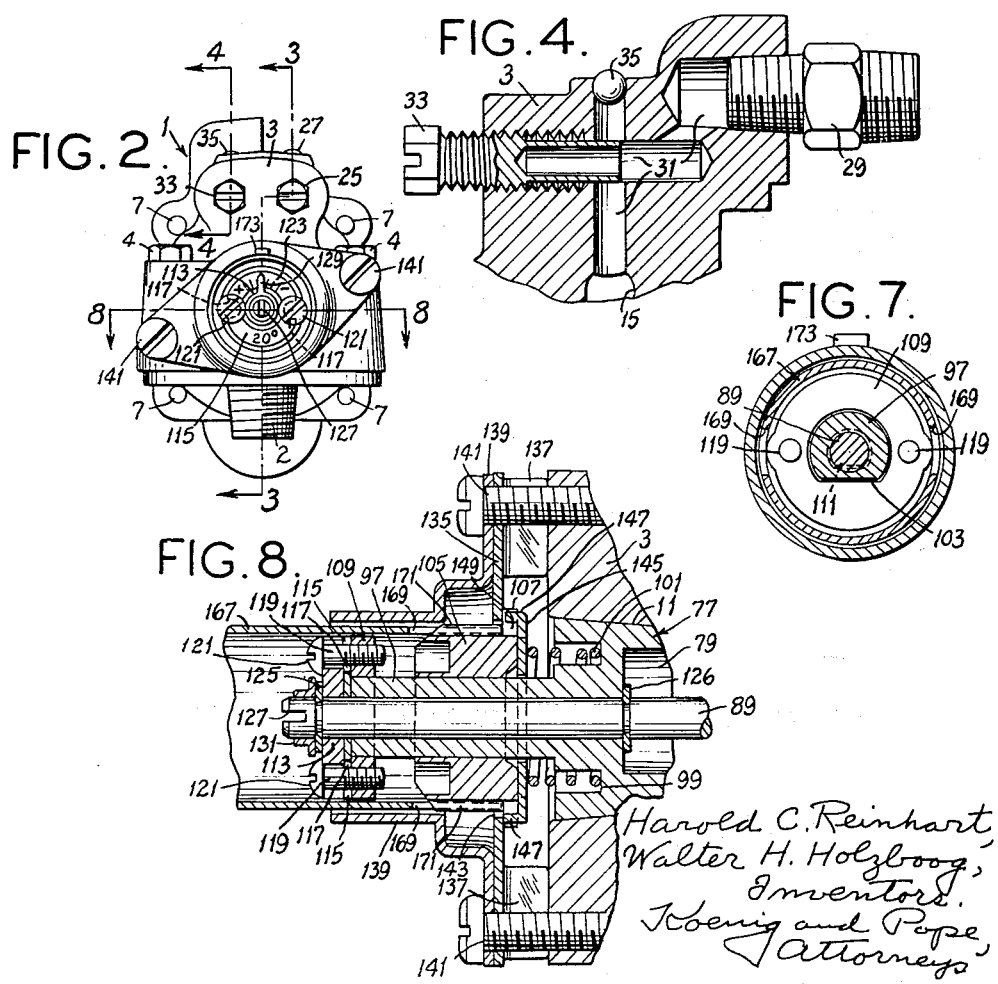

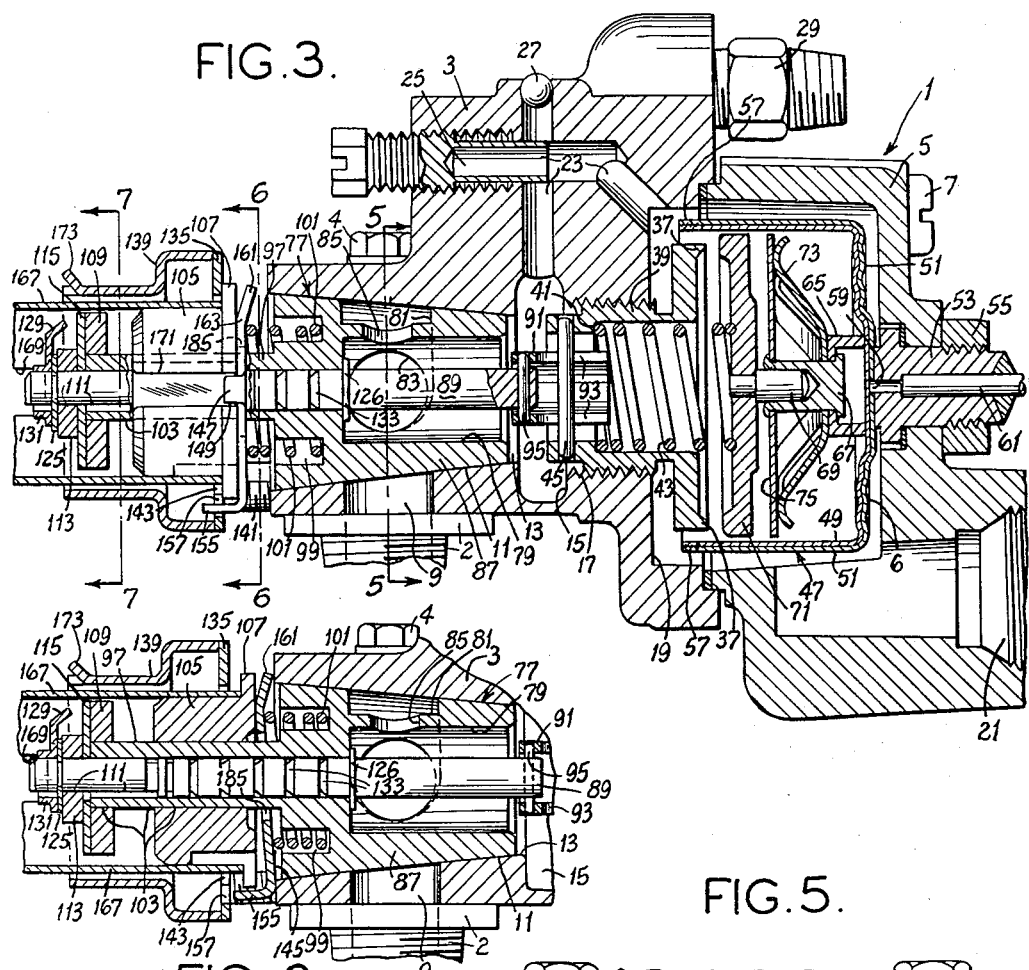

United States Patent Office 2,980,386
Patented Apr. 18, 1961

2,980,386

THERMOSTATIC GAS VALVE CONTROL

Harold C. Reinhart, Ferguson, Mo. (5005 Daggett Ave., St. Louis, Mo.), and Walter H. Holzboog, Clayton, Mo.

Filed Apr. 30, 1959, Ser. No. 810,061

10 Claims. (Cl. 251—96)

This invention relates to thermostatic gas valve controls, and with regard to certain more specific features, to such controls for gas valves having thermostatic control elements such as are used on oven controls on cooking ranges and the like.

Among the several objects of the invention may be noted the provision of a more safely operable latch construction in a gas valve of the class above referred to; the provision of such a latch construction which is compact in form and which with minimum axial movement of the control handle will accomplish unlatching from a locked to a released position; the provision for the thermostatic control elements of a gas valve of improved calibrating means which are of simple form and of low cost in construction and assembly; and the provision of apparatus of this class which is convenient to manipulate and calibrate. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a side elevation of a typical valve construction to which the invention is applicable;

Fig. 2 is a left end view of Fig. 1 with certain panel, trim and control handle parts removed;

Fig. 3 is an enlarged vertical axial section taken on line 3—3 of Fig. 2;

Fig. 4 is an enlarged fragmentary vertical section taken on line 4—4 of Fig. 2;

Figs. 5, 6 and 7 are cross sections taken on lines 5—5, 6—6, and 7—7, respectively, of Fig. 3;

Fig. 8 is an enlarged fragmentary horizontal section taken on line 8—8 of Figs. 1 and 2; and, Fig. 9 is a fragmentary axial section like certain parts shown at the left in Fig. 3, except that an alternate position of said parts is shown.

Corresponding reference characters indicate corresponding parts throughout the several views of the drawings.

Although the valve to be described has general use, a particular use is for thermostatic gas valves for oven temperature control, in relation to which the invention will be described as an example.

Referring now more particularly to the drawings, there is shown at numeral 1 a hollow casing formed of parts 3 and 5, held together by screws 7. At numeral 9 is shown a gas inlet which communicates with a conical valve seat 11 in part 3. A threaded inlet fitting 2 connected with inlet 9 is held in place by bolts 4. The small end 13 of the seat 11 communicates with a passage 15. Passage 15 communicates through a threaded outlet 17 with a compartment 19, the latter having a gas outlet 21. This outlet 21, by means of suitable piping, is connected with the main burner (not shown) in an oven.

The passage 15 is also connected with compartment 19 through by-passages 23 which are under control of an adjustable threaded sleeve valve 25. The passages 23 are composed of various cross drilling, one of which is plugged after drilling by a driven-in ball 27. The passage 15 (Fig. 4) by means of by-passages 31 is also connected with a gas outlet 29. Passages 31 are under control of a threaded sleeve valve 33. Two of these passages are cross drilled, one of which is plugged after drilling by a driven-in ball 35. The outlet 29 is connected by means of a suitable pipe with a pilot burner (not shown) located adjacent to the main burner (above-mentioned) in the oven.

At 37 is shown an outlet valve seat having a tubular stem 39 threaded in the opening 17. This tubular member 39 has a shoulder 41 for seating a spring 43. The shoulder at the left carries a crosspin 45. A bi-metallic cup-shaped diaphragm 47 is located in the compartment 19. It has an inside wall 49 and an outside wall 51, the latter being soldered or otherwise attached to the end of a nipple 53 held by means of a nut 55 in an opening in member 5. The marginal portions 57 of the members 49 and 51 are sealed together as by welding or soldering, the remaining portions of the members 49 and 51 being unjoined. They are corrugated in their portions forming the bottom 6 of cup 47. The outside member 51 is provided with an opening 59, communicating through the hollow nipple 53 with a capillary tube 61 sealed thereto and extending to a bulb 63, also located in the oven. The bulb 63, tube 61 and available space between the bimetallic members 49 and 51 are filled with a thermally responsive liquid which is adapted upon thermal expansion in response to heating to enter in between the members 49 and 51, so as to force them apart. This drives the bottom of the member 49 to the left. The inner member 49 forms a support 65 which has a sliding engagement with a cup member 67 in which is a stem 69 of a valve 71. A fingered spring rosette 73 slides on 67 and abuts support 65, pressing marginally against a plate 75 riveted to the end of the member 67. The support 65 and inner portions of the rosette 73 are limitedly slidable to the left on member 67. Thus, in response to increased oven temperatures, the fluid in the system 63, 61, 49, 51 expands and presses parts 49, 65, 73, 69 and valve 71 to the left, tending to close off the passage between this valve 71 and its seat 37. The spring 43 provides reaction between the collar 41 and the valve 71 for valve reopening purposes when the fluid cools. In response to very high temperatures, the valve may close upon its seat 37, in which event further expansion of the fluid, pressing upon the bottom of member 49, will overrun parts 65 and 73 on member 67, thus compressing rosette 73 without damage to any parts. Upon cooling, the reverse action occurs and valve 71 moves away from the seat 37 to allow flow of more gas therebetween. The cup shape of the bimetallic parts 49, 51 is for ambient temperature-compensating purposes in a manner known in the art and requiring no elaboration herein.

At numeral 77 is shown a cup-shaped conical plug valve in the conical seat 11. This valve has a hollow center 79 communicating with passage 15. The hollow center 79 is surrounded by a groove 81 which communicates with the center 79 through opposite passages 83 and also through an intermediate passage 85 (Fig. 5). This leaves a solid portion 87 of the valve which cuts off the inlet 9 in a shut-off position of the valve, as indicated in Fig. 5. The valve may be turned from its initial open position throughout an angular range in which one or both of a passage 83 and 85 are in communication with the inlet 9. The parts thus far described are known to the art (see, for example, United States Patent 2,757,871), and further description of them will be unnecessary herein.

Extending through the conical plug valve 77 is a control stem 89, to the right-hand end of which is attached a sleeve 91, slotted as shown at 93 for the reception of the pin 45. The sleeve 91 is held to the stem 89 by means of a pin 95. Thus if the stem 89 is turned with respect to the valve 77, the hollow stem 39 may be threadably turned in the threaded opening 17, thus adjusting the axial position of the valve seat 37 relative to the thermostatically controlled range of movement of the valve 71.

The left-hand end of the valve 77 is provided with a hollow stem 97. A counterbored seat 99 is arranged in valve 77 for the reception of the end of a spring 101. The control stem 89 extends through the hollow valve stem 97 and out beyond its left-hand end. The hollow valve stem 97 and an arbor 105 are splined by means of conjugate flats 103. The arbor 105 is flanged as shown at 107. Thus the hollow valve stem 97 and the arbor 105 are adapted to rotate together but to have relative sliding movements. Splined on the hollow valve stem 97 by means of additional conjugate flats 103 is a washer 109. Thus the washer 109 and the stem 97 are adapted to rotate together.

The left end of the control stem 89 also has a flat, as shown at 111, where it extends from the hollow valve stem 97. This is for the splined reception of a washer 113 having a cooperating conjugate flat. Thus the washer 113 and the control stem 89 are adapted to rotate together.

At numeral 115 is shown a sheet-metal dial, located at the end of the hollow valve stem 97 and having a central hole interiorly clearing the control stem 89 without any splined relation therewith. The dial 115 is provided with opposite notches 117, accommodating the shanks of screws 119 threaded into the washer 109 (Figs. 2 and 8). The heads 121 of the screws overhang the washer 113 and are adapted to clamp it when the screws are tightened in washer 109. Thus by loosening the screws 119, relative rotation may be effected between the control stem 89 and the hollow valve stem 97. This is accomplished by applying a screwdriver to the slot 127 of the stem 89. During relative rotation, the washer 113 rotates with stem 89 while the washer 109 rotates with the valve stem 97, holding with it the dial 115. The dial 115 is indexed, as shown at 123, to show angles of adjustment between stems 89 and 91 which accord to 20° steps in controlled temperature (see designation 20° carried on dial 115). The control stem 89 is prevented from moving axially by collar-forming horseshoe spring washers 125 and 126, clipped into grooves in the stem 89. The right-hand one of these (126) becomes located adjacent the bottom of the hollow center 79 in the plug valve 77. The left-hand one of these (125) is located adjacent washer 113. The sum of the thicknesses of the washer 113 and dial 115 snugly infills the space between washer 125 and the end of the stem 97. The stem 89, with some clearance, freely floats with respect to the valve 77, both when the screws 119 are loose for adjustment and when they are tightened after an adjustment. A small pointer 129, having a central collar 131, is press-fitted onto the end of the stem 89 to indicate in connection with the indexing 123 the angular adjustment between stem 89 and the valve 77. Numerals 133 indicate lubricant-retention grooves in the stem 89.

At numeral 135 is shown a sheet-metal platform member, having struck-out supports 137 engaging the end of the member 3. Overlying this platform member 135 is a sheet-metal jacket 139. Parts 135 and 137 are held to member 3 on the supports 137 by means of screws 141. Members 135 and 139 form a cage for the arbor 105 and the extensions of stems 89 and 97. When assembled, the flange 107 of the arbor 105 lies between the platform member 135 and body 3. The body portion of the arbor extends through an opening 143 in platform 135, which hole is somewhat larger than the diameter of the arbor. This admits an extension sleeve 167 of a control knob to be described. Adjacent the right-hand end of the arbor 105 is a latch plate 145, seen in end view in Fig. 6. This plate has ears 147, loosely interfitting with opposite notches 149 of the flange 107. It also has radially extending ears 151 and 153, flanking a tongue 155 which is struck out toward a notch 157 cut into the bottom of the opening 143. Tongue 155 is normally located as shown in Fig. 3. Ears 151 and 153 are adapted when plate 145 is rotated alternately to engage a lug 159, struck out to the right of the platform member 135.

The plate 145 has a bent-out ear 161 which, with the remainder of the plate, forms a rocking edge 163. This edge 163 is adapted for rocking of the plate on the flanged end of the arbor 105. The spring 101, reacting from valve 77, presses on the latch plate 145, normally forcing it flat against the flange 107, as shown in Figs. 3 and 6. Thus upon moving the arbor 105 to the right from the position shown in Fig. 3 to that shown in Fig. 9, the spring is compressed until the ear 161 engages member 3. This rocks the plate 145 anticlockwise to withdraw the tongue 155 from the notch 157. This frees the arbor for rotation. Upon rotation of about 276° from the Fig. 6 position (wherein ear 153 engages stop 159), ear 151 will engage the other side of the stop 159. Such rotary action first opens the gas inlet 9 and maintains it open, the flow of gas being thereafter controlled by the thermostatic action of the valve 71 in connection with the valve seat 37.

At numeral 165 (Fig. 1) is shown an operating knob, to which is clinched a metal extension sleeve 167. Sleeve 167 is slotted on opposite sides as shown at 169 for cooperation with splines 171 carried on opposite sides of the arbor 105 (Fig. 8). A snug frictional holding fit is arranged between this sleeve 167 and the arbor, so that the operating knob is fairly tightly supported thereon. The purpose of the jacket 139, which has a struck-up member 173, is to accept the central sleeve portion 175 of a trim ring assembly 177. Sleeve 167 is not borne or guided by the jacket 139, there being ample clearance therebetween. The sleeve 175 is appropriately notched at 179 to accept said struck-up tongue 173 so as to prevent trim ring rotation. The trim ring assembly 177 is located on the front of a stove panel 181, being lightly pressed against the panel by a cone spring 183 reacting from the inside of knob 165. The action of spring 183 is quite light, so that in view of the snug fit between the sleeve 167 and the arbor 105, the sleeve is not driven from the arbor. The margin of the knob 165 is provided with suitable indicia, as indicated at 187, cooperating with a suitable marker 189 on the trim ring 177 to indicate temperatures to be expected in the oven by turning the knob.

Operation is as follows:

According to the off position shown in the drawings, the plug valve 77 is in a position to close the inlet port 9 (Fig. 5). At this time spring 101 is in expanded position wherein the latch plate 145 is rocked flat against the right-hand flanged end 107 of the arbor 105 (Figs. 3, 5, 6 and 8). This places the tongue 155 in the notch 157 which locks the valve 77 against rotation, including the arbor 105, tube 167 and knob 165 assembled thereon. In order to turn the valve on, the knob 165 is first pushed in axially. This pushes the sleeve 167 in through opening 143 and against flange 107, as shown in Fig. 9, thereby compressing spring 101. As a result, the latch plate 145 advances to the right until the ear 161 engages the part 3, thus rocking the latch plate anticlockwise on the edge 163. It will be understood that the central opening 185 in the latch plate 145 is large enough to permit this rocking around the hollow valve stem 97. The knob 165 may then be turned anticlockwise, viewing Fig. 1 from the left. This is tantamount to a clockwise rotation as viewed in Fig. 6. The free rotation is approximately 276° before the ear 151 reaches the stop 159. A few degrees of this motion are required to open the port 9, but after it has once opened, valve 77 remains open throughout the remainder of rotation of the knob 165. After the knob has been initially pushed in to release the tongue 155 from notch 157 and rotation initiated, the knob need not be held inward in order further to turn it, because the tongue 155 slides freely over the flat inner surface of the platform member 135.

The amount of rotation selected for the knob 165 is determined by the temperature desired in the oven, as marked at 187 on the knob 165 and pointed to by pointer 189 on trim ring assembly 177. It will be observed that the selected rotation also rotates the control stem 89, which at this time is locked to the hollow valve stem 97 and valve 77. This through members 91, 93, 95 and 45 rotates the hollow stem 39 of valve seat 37. This adjusts the location of the valve seat 37 in the compartment 19. At this time, valve 71 is retracted from the seat 37 because the liquid in the closed system extending from bulb 63 and to the cup 47 is cool. Gas then flows from the inlet 9 through open valve 77, passage 15, and through the hollow valve stem 39. At this point it escapes through the open valve 71 to outlet port 21. The oven burner connected with port 21 then receives gas, which is manually ignited. At the same time, gas flows from the passage 15 through the passages 31 to the outlet 29, which is connected to the pilot burner adjacent the oven burner. This pilot burner ignites and is for the purpose of reigniting the main burner, should it under minimum burning conditions happen to go out during the time that the valve 77 is open. In addition, gas flows from the port 15 through passages 23 to compartment 19 to the main gas outlet 21 into the main burner, so as to maintain a minimum flame if and when the valve 71 closes.

As the oven heats, the liquid in line 61 expands and forces to the left the bottom of the inside member 49 of cup 47. This moves the valve 71 toward seat 37 in a proportion to the temperature rise in the oven. At some position of the valve 71, approximately steady-state conditions will be reached in which the flow of gas to the burner is about that required to maintain a substantially constant temperature. To shut the valve off, the knob 165 is rotated clockwise (viewed from the left in Figs. 1–3), which is to say, anticlockwise in Fig. 6. This returns the ear 163 against stop 159, thus shutting off the plug valve 77 and depriving the entire system of gas from the inlet port 9. At this time the bias of spring 101 drives the tongue 155 into the notch 157, so as to lock the knob 165 against rotation until it is subsequently pushed in for the next operation of the valve.

Ordinarily the valve is calibrated at the factory for proper temperature control, but after installation recalibration may be required. This is readily accomplished by pulling the knob 165, with its sleeve 167, from the arbor 105. The friction fit between parts 167 and 105 allows for this, although the fit is tight enough to prevent the knob 165 from normally being driven off by spring 183. The removal exposes the dial member 115 and the heads 121 of screws 119. By loosening these, the washer 113 (splined to control stem 89) is loosened from its locked relationship with respect to the washer 109 (splined to valve stem 97). A screwdriver may then be applied to slot 127, and the control stem 89 turned relatively to the then fixed valve 77. This axially repositions the valve seat 37, the amount being indicated in terms of degrees of temperature change by the position of the pointer 129 relative to the 20° index markings 123 shown in Fig. 2. Temperature increase is indicated by anticlockwise adjustment and temperature decrease by a clockwise adjustment, as suggested by the plus and minus signs on the dial 115. After the adjustment has been made, the screws 119 are again tightened, which locks together the washers 109 and 113 and hence also the stem 89 and valve 77.

It is pointed out that the thermostatic control parts that lie to the right of line 5—5 in Fig. 3 are known in the art and have been disclosed herein in order to show the application of the invention in practice. The inventive features lie in the arrangement of parts to the left of this line 5—5 in Fig. 3.

An advantage of the invention is in the improved operation afforded by the rocking latch plate 145. This rocking arrangement provides for multiplication of the unlatching movement of the latched tongue 155 with respect to the driving movement from the knob 165 after the ear 161 touches part 3. The multiplication is obtained because of the relatively short lever arm formed by ear 161 on one side of the pivot at 63 and the relatively long lever arm formed between pivot 163 and tongue 155. The advantage will be apparent by comparing the positions of the latching parts shown at the left in Figs. 3 and 9. The result is a more definite and reliable unlatching action in response to less axial movement of the knob 165 after unlatching starts. Its definiteness is due to the comparatively easy axial movement of knob 165 until ear 161 contacts 3 and the substantial resistance thereafter occurring as the latch quickly opens. Thus the operator has an unmistakable manual signal when unlatching is about to occur after an initial easy push on knob 165. The subsequent short additional stronger push on the knob will definitely indicate its freedom for rotation. The result is an improvement in the safety with which the valve may be operated, mistakes regarding its on or off condition being less likely to occur than heretofore.

Another advantage of the invention is in the low-cost form and ease of operation of the calibrating members 109, 113, 115 and 119. These parts may be preassembled as a unit and thereafter pushed into position with the inner flat of washer part 109 and the inner flat of the washer 113 applied to the flats 103 and 111, respectively, of the stems 97 and 89, respectively. Then the spring washer 125 may be clipped into place and the pointer member 129 pressed into position. It will be understood that prior to this assembly operation the spring washer 126 will have been applied to the control stem 89 and this stem pushed into the hollow valve stem 97 to bring the washer 126 into the position shown in the drawings.

Another advantage of the invention is that the action of screws 119 in locking and releasing the stems 89 and 97 involves no tensioning on the control stem 89. Thus the control stem 89, whether locked or unlocked relative to valve stem 97, floats axially in valve 77, as determined by the clearance afforded between the inside surfaces of the washers 125 and 126.

The term splined as used herein means any connection between turning parts requiring them to rotate together but allowing relative axial movements as required either during operation or assembly. The flats 103 and 111 are examples of various means that may be used to that end.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a construction having a rotary stem extending from a body member; the improvement comprising an arbor splined to the stem, a fixed cage around the arbor and spaced from said body member, said arbor having axially operative stop means located between the body member and the cage engageable with the cage to limit axial movement of the arbor along the stem away from the body member, a latch member located between said body member and the arbor, said latch member having a rocking contact with the arbor, spring means biasing the latch member to an initial rocked position and biasing the arbor toward its limit position relative to the cage, stop means on the cage, said latch member having an extension on one side of the stem directed toward the cage and movable to and from said stop means when the latch member is moved to said initial position by the spring means, said latch member having a projection on the other side of said stem extending toward the body member for engagement therewith upon axial movement of the arbor toward the body member whereby the latch member may be rocked to remove said extension from said stop means, said latch member and arbor having a rotary driving connection therebetween.

2. A construction according to claim 1, wherein the ratio of movement of said extension to movement of said projection is relatively large during rocking movements.

3. A construction according to claim 1, wherein said cage includes a stop member and said latch plate includes rotary stop means adapted for rotary engagement with said stop member when the arbor is rotated.

4. A construction according to claim 2, wherein said cage includes a stop member and said latch plate includes rotary stop means adapted for rotary engagement with said stop member when the arbor is rotated.

5. In a construction having a rotary stem extending from a body member; the improvement comprising an arbor splined to the stem, a fixed cage around the arbor and spaced from said body member, said cage having a notch, said arbor having stop means between the body member and the cage engageable with the latter to limit movement of the arbor along the stem away from the body member, a latch plate loosely surrounding the stem and located between said body member and the arbor, said latch plate having a rocking contact with the arbor, spring means biasing the latch plate to an initial position rocked against the arbor and biasing the arbor toward the cage, said latch plate having a tongue on one side of the stem extending toward the cage and movable into said notch when the latch plate is moved to said initial position, said latch plate having a projection on the other side of said stem extending toward the body member for engagement therewith upon axial movement of the arbor toward the body member, whereby the latch plate may be rocked to remove said tongue from said notch, said latch plate and arbor having a rotary driving connection therebetween and cooperative stop means on the latch plate and cage adapted to limit rotary movements of the latch plate.

6. Calibrating means for use between a hollow valve stem and a calibrating stem therein, comprising spline means on both the hollow stem and the calibrating stem, the spline means of the calibrating stem extending beyond the end of the hollow stem, a washer splined to the hollow stem, a second washer splined to the calibrating stem, and clamp screws threaded into the washer on the hollow stem, the heads of said screws being adapted for clamping engagement with said washer on the calibrating stem.

7. Calibrating means for use between a hollow valve stem and a calibrating stem therein, comprising spline means on both the hollow stem and the calibrating stem, the spline means of the calibrating stem extending beyond the end of the hollow stem, a washer splined to the hollow stem, a second washer splined to the calibrating stem, an unsplined calibrated dial surrounding the calibrating stem and located beyond the end of the hollow stem, said dial being marginally notched, and clamp screws passing through said notches and threaded into the washer on the hollow stem, the heads of said screws having clamping engagement with said washer on the calibrating stem.

8. Calibrating means according to claim 7, including spaced shoulder means on the calibrating stem, one of which is located adjacent one end portion of the hollow valve stem and the other of which is located adjacent said washer which is splined to the calibrating stem.

9. Calibrating means according to claim 8, including a pointer attached to the end of the calibrating stem outside of the shoulder means adjacent the washer on the calibrating stem.

10. In a construction having a rotary hollow stem extending from a body member; the improvement comprising an arbor and a comparatively large washer splined to the outside of the hollow stem, a cage around the arbor and spaced from said body member, said arbor having axially operative stop means located between the body member and the cage engageable with the cage to limit axial movement of the arbor along the stem away from the body member, a latch member located between said body member and the arbor, said latch member having a rocking contact with the arbor, spring means biasing the latch member to an initial rocked position and biasing the arbor toward its limit position relative to the cage, said cage having a recess-forming portion, said latch member having an extension on one side of the hollow stem directed toward the cage and movable to and from said recess-forming portion when the latch member is moved to said initial position by the spring means, said latch member having a projection on the other side of said hollow stem extending toward the body member for engagement therewith upon axial movement of the arbor toward the body member whereby the latch member may be rocked to remove said extension from said recess-forming portion, said latch member and arbor having a rotary driving connection therebetween, a calibrating stem in and extending beyond the hollow stem, a relatively small washer splined to the calibrating stem beyond the end of the hollow stem, and clamp screws threaded into the larger washer on the hollow stem, the heads of said screws having clamping engagement with the margin of said smaller washer on the calibrating stem.

References Cited in the file of this patent

UNITED STATES PATENTS

| | | |
|---|---|---|
| 1,869,917 | Schmieding | Aug. 2, 1932 |
| 2,151,541 | Waddell | Mar. 21, 1939 |
| 2,179,281 | Coultrip | Nov. 7, 1939 |
| 2,299,666 | Turner et al. | Oct. 20, 1942 |
| 2,694,525 | Winet | Nov. 16, 1954 |
| 2,757,871 | Douglas | Aug. 7, 1956 |
| 2,800,807 | Gomersall et al. | July 30, 1957 |
| 2,801,800 | Brumbaugh | Aug. 6, 1957 |
| 2,826,368 | Winslow | Mar. 11, 1958 |